(12) United States Patent
Levit

(10) Patent No.: US 8,268,434 B2
(45) Date of Patent: Sep. 18, 2012

(54) HONEYCOMB HAVING A HIGH COMPRESSION STRENGTH AND ARTICLES MADE FROM SAME

(75) Inventor: Mikhail R. Levit, Glen Allen, VA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 634 days.

(21) Appl. No.: 12/275,279

(22) Filed: Nov. 21, 2008

(65) Prior Publication Data

US 2009/0155526 A1    Jun. 18, 2009

Related U.S. Application Data

(60) Provisional application No. 61/005,071, filed on Nov. 30, 2007.

(51) Int. Cl.
*B32B 3/12* (2006.01)
*B32B 5/02* (2006.01)
*E04B 1/62* (2006.01)

(52) U.S. Cl. ............... 428/116; 428/327; 52/302.1

(58) Field of Classification Search .............. None
See application file for complete search history.

(56) References Cited

U.S. PATENT DOCUMENTS

| | | | |
|---|---|---|---|
| 3,756,908 A | 9/1973 | Gross | |
| 3,937,989 A * | 2/1976 | Meijer | 327/458 |
| 4,698,267 A | 10/1987 | Tokarsky | |
| 4,729,921 A | 3/1988 | Tokarsky | |
| 5,026,456 A | 6/1991 | Hesler et al. | |
| 5,084,136 A | 1/1992 | Haines et al. | |
| 5,223,094 A | 6/1993 | Kirayoglu et al. | |
| 5,314,742 A | 5/1994 | Kirayoglu et al. | |
| 5,833,807 A | 11/1998 | Ramachandran et al. | |
| 6,673,415 B1 * | 1/2004 | Yamazaki et al. | 428/117 |
| 2005/0230072 A1 * | 10/2005 | Levit | 162/146 |

FOREIGN PATENT DOCUMENTS

| | | | |
|---|---|---|---|
| EP | 0739707 | | 10/1996 |
| EP | 1048446 | | 11/2000 |
| JP | 05 186608 A | | 7/1993 |
| JP | 07 184 774 | | 7/1995 |
| JP | 2001-277387 | * | 10/2001 |
| JP | 2006274490 | | 10/2006 |
| WO | WO 95/17549 | * | 6/1995 |
| WO | WO2005/103376 | | 11/2005 |

OTHER PUBLICATIONS

Anonymous, "Mixed Aramid Papers", Research Disclosure, Disclosure 33873, Jun. 1992, p. 486.*
T. Bitzer (Chapman & Hall, publishers, 1997) Honeycomb Technology. pp. 18 to 20; First Eddition 1997.

* cited by examiner

*Primary Examiner* — David Sample
*Assistant Examiner* — Nicole Gugliotta

(57) ABSTRACT

High compression strength honeycomb is made from polymer paper containing 5 to 35 parts by volume solid material and 65 to 95 parts by volume voids having a normalized peak load at bend equal or greater than 0.33 mgf/(g/m2)^3 and a Gurley air resistance equal or greater than 50 seconds/100 ml.

4 Claims, 2 Drawing Sheets

HONEYCOMB HAVING A HIGH COMPRESSION STRENGTH AND ARTICLES MADE FROM SAME

BACKGROUND OF THE INVENTION

1. Field of the Invention

This invention relates to a high compression strength honeycomb made from a polymeric paper.

2. Description of Related Art

Honeycombs based on aramid papers are in use for various applications where strength to weight, stiffness to weight and some other normalized to weight properties are critical for the performance. Numerous examples can be found in aerospace applications. Traditionally such honeycomb has been manufactured from paper made with meta-aramid fiber and meta-aramid fibrid binder or with high modulus para-aramid fiber and meta-aramid fibrid binder. Usually, strong and tough calendered aramid paper is in use for making corresponding honeycombs. Such paper and honeycombs were optimized to provide good set of shear, compression and other properties of the honeycomb. However, there are some applications, in which enhancement of compression strength is of higher significance than other mechanical properties such as shear. This is particularly true for sandwich panels used in flooring for aircraft, trains, etc. Potentially, a honeycomb optimized for compression strength, can provide additional weight and cost savings. Therefore what is needed is a honeycomb made in a way that the paper and honeycomb manufacturing processes are optimized together to provide a maximum compression strength of the honeycomb for a given honeycomb cell size and density.

BRIEF SUMMARY OF THE INVENTION

The present invention is directed to a honeycomb structure comprising a plurality of interconnected walls having surfaces which define a plurality of honeycomb cells, wherein said cell walls are formed from a paper comprising:
 a) 5 to 35 parts by volume solid polymeric material and
 b) 65 to 95 parts by volume of voids and
 wherein the paper has a normalized peak load at bend equal or greater than 0.33 mgf/(g/m2)^3 and a Gurley air resistance equal or greater than 50 seconds/100 ml.
 (Mgf means milligram force and g/m2 means grams per square meter).

This invention also relates to a honeycomb wherein the paper has a resin coating and articles such as panels formed from the honeycomb.

DETAILED DESCRIPTION OF THE INVENTION

This invention relates to a honeycomb made from a polymeric paper wherein the honeycomb has superior compression strength. A honeycomb, under compression fails by buckling of cell wall. The resistance of the cell wall to buckling, is a very good indicator of compression strength of a honeycomb. Therefore testing of paper sheets gives a relative indication as to how a honeycomb containing the same paper performs under compressive load.

With such a correlation present between compression strength of the honeycomb vs a paper to be used in cell wall of the honeycomb, a paper test procedure is employed in the present disclosure. Such paper procedure is based on normalized peak load at bend, which will be described in detail below. A higher numerical value for normalized peak load at bend translates to higher compression strength of a honeycomb having cell walls formed from the paper.

Figure 1A:
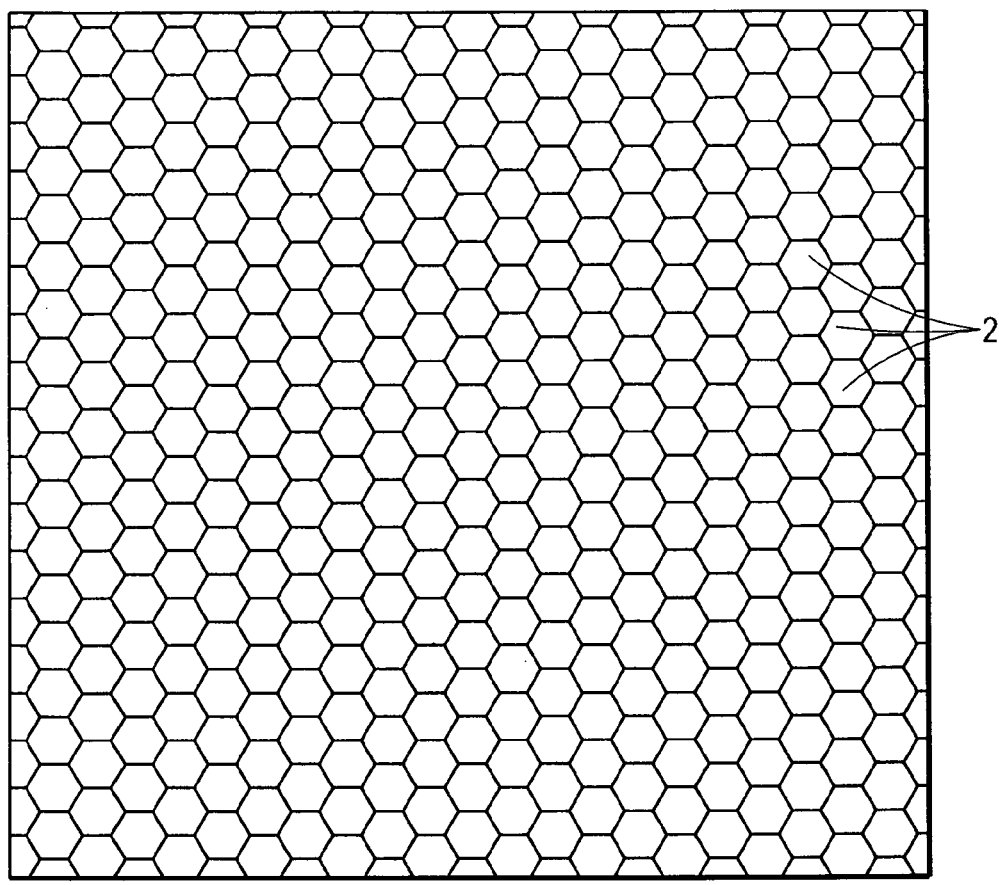
FIGS. 1A and 1B are representations of views of a hexagonal shaped honeycomb.
Figure 1B:
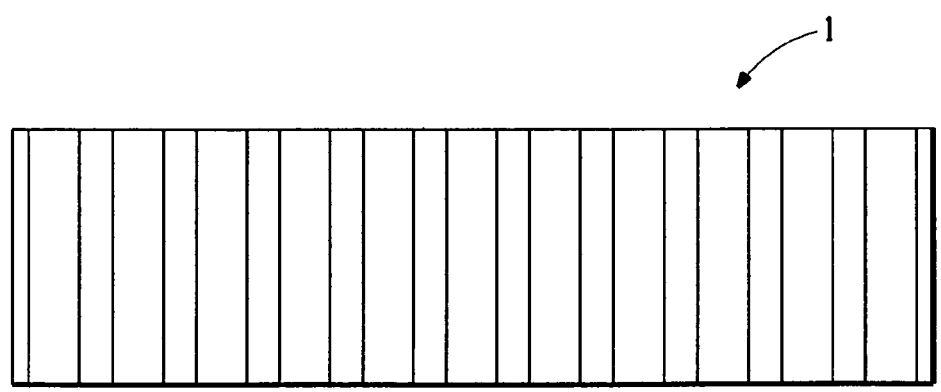
Figure 2:
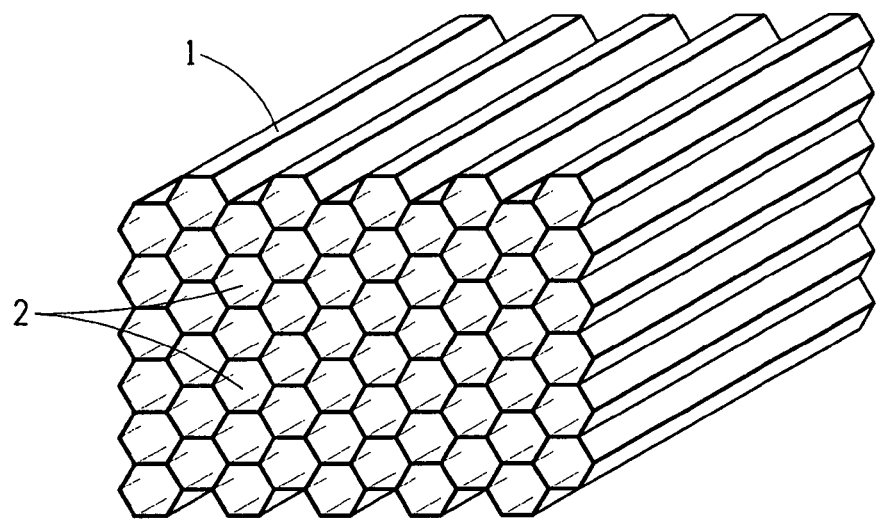
FIG. 2 is a representation of another view of a hexagonal cell shaped honeycomb.
Figure 3:
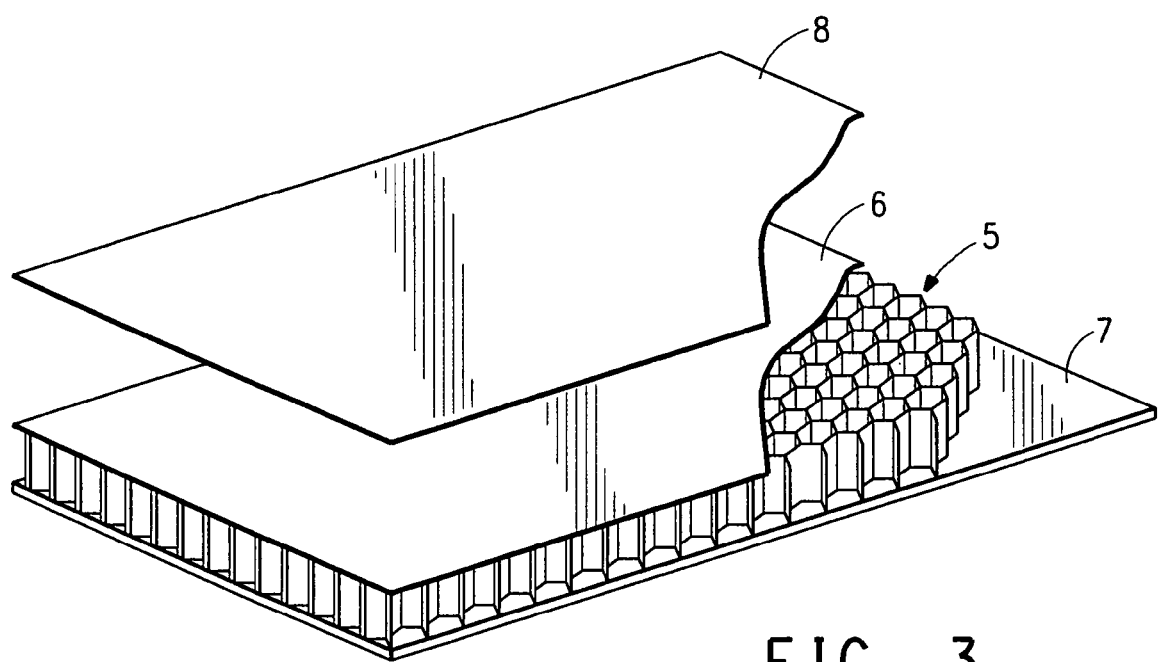
FIG. 3 is an illustration of honeycomb provided with facesheet(s).

FIG. 1A is one illustration of one honeycomb of this invention. FIG. 1B is an orthogonal view of the honeycomb shown in FIG. 1A and FIG. 2 is a three-dimensional view of the honeycomb. Shown is honeycomb 1 having hexagonal cells 2. The "Z" dimension or the thickness of the honeycomb is shown in FIG. 2. This dimension is also known as the "T" direction and is the direction along which a compressive force is applied. FIG. 3 is an illustration of a honeycomb sandwich panel having facesheets 7 and 8 bonded to the honeycomb. The facesheets are normally metallic or fiber reinforced plastic. An adhesive layer, 6, may also be required to provide adequate bonding.

Hexagonal cells are shown in the Figures; however, other geometric arrangements are possible with square, over-expanded and flex-core cells being among the most common possible arrangements. Such cell types are well known in the art and reference can be made to *Honeycomb Technology* by T. Bitzer (Chapman & Hall, publishers, 1997) for additional information on possible geometric cell types.

The honeycomb has cell walls provided with a polymeric paper with the planes of the cell walls preferably parallel to a Z-dimension of the honeycomb. The polymeric paper for honeycomb cell walls comprises 5 to 35 parts by volume solid material and 65 to 95 parts by volume of voids with the paper having a normalized peak load at bend equal or higher than 0.33 mgf/(g/m2)^3 and Gurley air resistance not less than 50 seconds/100 ml.

The volume of voids in the polymeric paper can be determined based on a known density of paper without voids compared to the paper with voids or by image analysis of the paper having voids.

A preferred paper contains both fibers and fibrids. A preferred range is 20 to 70 weight percent fibers and correspondingly 30 to 80 weight percent fibrids. The preferred polymeric material for both the fibers and fibrids is m-aramid.

However it is understood that the composition of both the fibers and fibrids can vary. Illustratively for aerospace applications, preferable types of fibers include aramid, liquid crystal polyester, polybenzazole, polypyridazole, carbon, glass and other inorganic fibers or mixtures thereof and preferable types of fibrids include poly (m-phenylene isophthalamide), poly(p-phenylene terephthalamide), polysulfonamide (PSA), poly-phenylene sulfide (PPS), and polyimide.

The polymeric paper can be coated with a resin before or after formation of the honeycomb. Resin can be employed which is crosslinked after application to the paper in the honeycomb to optimize final properties such as stiffness and strength. Examples of resins include epoxy, phenolic, acrylic, polyimide and mixtures thereof.

As previously set forth the polymeric paper has a Gurley air resistance of 50 seconds/100 ml or higher which is considered to be a high air resistance due to a low permeability of the paper. This low permeability of the paper facilitates only an incomplete resin penetration into voids of the paper during a subsequent resin coating process such as by dipping. The coating can be applied to the paper before or after honeycomb formation; however coating after honeycomb formation is preferred in many instances. Incomplete resin penetration can aid in obtaining a honeycomb having superior compression strength with a low weight of resin.

A honeycomb structure optimized for the maximum compression strength to weight ratio is important for weight savings in flooring and other applications. Often in such instances the compression strength of the honeycomb has a higher priority compared to other mechanical properties of the honeycomb.

The thickness and weight of the paper are dependent upon the end use or desired properties of the honeycomb. For purposes of illustration a suitable thickness from 3 to 10 mils (75 to 250 micrometers) and a suitable weight is from 0.5 to 6 ounces per square yard (15 to 200 grams per square meter).

As employed herein the term aramid means a polyamide wherein at least 85% of the amide (—CONH—) linkages are attached directly to two aromatic rings. Additives can be used with the aramid. In fact, it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride of the aramid. Aromatic polyamide fibers and various forms of these fibers are available from E. I. du Pont de Nemours and Company, Wilmington, Del. under the trademarks NOMEX® and Kevlar® and from Teijin, Ltd., under the trademarks Teijin-Conex® and Twaron®. Commercially available polybenzazole fibers include Zylon® PBO-AS (Poly(p-phenylene-2,6-benzobisoxazole) fiber, Zylon® PBO-HM (Poly(p-phenylene-2,6-benzobisoxazole)) fiber, both available from Toyobo Co. Inc., Osaka, Japan. Commercially available carbon fibers include Tenax® fibers available from Toho Tenax America, Inc, Rockwood, Tenn. Commercially available liquid crystal polyester fibers include Vectran® HS fiber available from Kuraray America Inc., New York, N.Y.

The paper can also include inorganic particles and representative particles include mica, vermiculite, and the like; the addition of these performance enhancing additives can impart properties such as improved fire resistance, thermal conductivity, dimensional stability, and the like to the paper and the final honeycomb.

The paper can be formed on equipment of any scale, from laboratory screens to commercial-sized papermaking machinery, including such commonly used machines as Fourdrinier or inclined wire paper machines employing a conventional process well known in the art Reference is made to United States Patent and Patent Application Nos. U.S. Pat. No. 3,756,908 to Gross; U.S. Pat Nos. 4,698,267 and 4,729,921 to Tokarsky; U.S. Pat. No. 5,026,456 to Hesler et al.; U.S. Pat. No. 5,223,094 to Kirayoglu et al.; U.S. Pat. No. 5,314,742 to Kirayoglu et al. for illustrative processes for forming papers from various types of fibers and fibrids.

Once the paper is formed, it is preferably not calendered. Slight densification through calendering of the paper can be conducted, provided the void content is not reduced below 65%. Also heat treatment of the paper can be undertaken such as to increase peak load at bend or one or more other mechanical properties. Such treatment can be performed on the paper before or after formation of the honeycomb.

The fiber in the paper can be in the form of the cut fiber (floc), pulp, or mixture thereof. The term "pulp", as used herein, means particles of fibrous material having a stalk and fibrils extending generally therefrom, wherein the stalk is generally columnar and about 10 to 50 micrometers in diameter and the fibrils are fine, hair-like members generally attached to the stalk measuring only a fraction of a micrometer or a few micrometers in diameter and about 10 to 100 micrometers long. An illustrative process for making aramid pulp is generally disclosed in U.S. Pat. No. 5,084,136.

The term "fibrids" as used herein, means a finely-divided polymer product of small, filmy, essentially two-dimensional, particles having a length and width of 100 to 1000 micrometers and a thickness of 0.1 to 1 micrometer. Fibrids are typically made by streaming a polymer solution into a coagulating bath of liquid that is immiscible with the solvent of the solution. The stream of polymer solution is subjected to strenuous shearing forces and turbulence as the polymer is coagulated.

Processes for converting papers into honeycombs are well known to those or ordinary skill in the art and include expansion and corrugation. An expansion process is particularly well suited for making flooring grade core. Such processes are further detailed on page 721 of the Engineered Materials Handbook, Volume 1—Composites, ASM International, 1988.

The final mechanical strength of floor panel core is result of a combination of several factors. The principal known contributors are paper composition and thickness, cell size, and final core density such as after coating with resin. Cell size is the diameter of an inscribed circle within the cell of a honeycomb core. For floor core, typical cell sizes range from ⅛"-⅜" (3.2 mm-9.6 mm) but other sizes are possible.

It is also known that the main mechanism of the failure of honeycomb core under a compression load is buckling of its cell walls. Such buckling is very similar to going above peak load at bend. Therefore for the data presented, peak load at bend has been used as a characteristic of the paper and hence the cell wall resistance to buckling. The higher the peak load of the paper, the higher will be the compression value of the core.

The bending moment M for one wall can be calculated as follows (Mechanical Engineers' Handbook, Ed. By Myer Kutz, A Wiley-Interscience Publication, 1986):

$$M = r(E*b*h^3)/12$$

Where r=radius of curvature, E=modulus of elasticity, b=width of the cell wall and h=thickness of the paper. In examples where paper and not honeycomb was tested, b=width of the paper.

It is common practice to use paper of the same density but different thicknesses to make honeycomb, for example standard Nomex® type T412 papers of different thickness are commercially available. For the same density of the paper used to make the honeycomb, thickness of paper before the resin coating is in proportion to basis weight of the material. There is a broad correlation that for the same type of paper with constant density, bending moment and peak load to bend are changed in the same manner with the corresponding change of the paper basis weight. Therefore, to distinguish an influence of the paper density and additional special treatment, the peak load at bend has been normalized for the basis weight in the power of 3 of the cell wall material. This eliminates the contribution from paper basis weight in influencing peak load at bend, and hence compressive strength.

Accordingly as employed herein "normalized peak load at bend" means the maximum load to bend in milligrams (mg) force divided by the basis weight of the paper, or coated paper, (in g/m2) to the power of 3.

In the following examples all parts and percentages are by weight unless otherwise indicated.

Test Methods

Paper density was calculated using paper thickness measured by ASTM D374-99 and the basis weight measured by ASTM D646-96. Fiber denier was measured using ASTM D1907-07.

Peak load at bend for the paper and the resin coated/impregnated paper was determined based on a three point method described in ASTM D5934-02 by using a sample of 1 inch (2.54 cm) long, 4 inches (10.16 cm) wide, with a support span of 0.5 inches (1.27 cm), loading nose radius of 0.125 inches (3 mm), and loading speed 0.1 in/min (2.54 mm/min). Normalized peak load to bend was determined as maximum load to bend in milligrams (mg) force divided by basis weight of the paper or coated paper (in g/m2) in power of 3.

Gurley Porosity for papers was determined by measuring air resistance in seconds per 100 milliliters of cylinder displacement for approximately 6.4 square centimeters circular area of a paper using a pressure differential of 1.22 kPa in accordance with TAPPI T460.

EXAMPLES

Examples 1 and 2

M-aramid paper was formed as described in U.S. Pat. No. 3,756,908 to Gross by using about 50 weight % of poly(metaphenylene isophthalamide) fibrids and about 50 weight % of m-aramid floc. The m-aramid floc was floc of linear density of about 0.22 tex (2.0 denier) and of about 6.4 mm long, cut from the fiber sold by E. I. du Pont de Nemours and Company of Wilmington, Del. (DuPont) under the trademark NOMEX®.

After forming, the paper was additionally heat-treated by passing around two hot metal rolls with surface temperature of about 325° C. Properties of the paper are shown in Table 1.

Examples 1 and 2 employed two different basis weights which were 42 gsm and 62 gsm respectively.

Comparative Examples 1 and 2

Papers were formed as in Examples 1 and 2, but no additional heat treatment was conducted. Properties of the paper are shown in the Table 1.

The basis weights of Comparative Examples 1 and 2 were 40 gsm and 60 gsm respectively.

Comparative Examples 3 and 4

Papers were formed as in Example 1. After forming, the papers were calendered between two metal rolls heated to 350° C. at linear pressure of about 3000 N/cm. Properties of the paper are shown in Table 1.

The basis weights of Comparative Examples 3 and 4 were 42 gsm and 61 gsm respectively Comparative Examples 5 and 6

The papers were formed and heat treated in as in Example 1 but with the surface temperature of the metal rolls being 260° C. Properties of the paper are shown in Table 1.

The basis weights of Comparative Examples 5 and 6 were 40 gsm and 61 gsm respectively Examples 3 and 4

10"×8" samples of paper from Examples 1 and 2 were dipped in a solution of Plyophen® 23900 phenolic resin type supplied by Durez Corporation, Novi, Mich. After dipping, an excess of the resin was removed by blotting paper and the impregnated paper was heat treated to cure the resin using a cure cycle: 15 minutes at 82° C., 15 minutes at 121° C., and 60 minutes at 182° C. Properties of the final sheet structures are shown in Table 2.

Comparative Examples 7 and 8

10"×8" samples of paper of Comparative Examples 3 and 4 were dipped in a solution of Plyophen® 23900 phenolic resin. After dipping, an excess of the resin was removed by blotting paper and the impregnated paper was heat treated to cure the resin using the same cure cycle as in Examples 3 and 4. Properties of the final sheet structures are shown in table 2.

Example 5

A honeycomb block can be made in accordance with the following steps.

A honeycomb block is formed from the paper of Example 1. Such a process is well known to those skilled in the art but is summarized in the following manner.

Node lines of adhesive resin are applied to the paper surface with the width of the lines of adhesive being 1.78 mm. The pitch, or the linear distance between the start of one line and the next line, is 5.3 mm. The node line adhesive resin is a 50% solids solution comprising 70 parts by weight of an epoxy resin, Epon® 826, available from Hexion Specialty Chemicals, Houston, Tex.; 30 parts by weight of an elastomer-modified epoxy resin identified as Heloxy WC 8006 sold by Wilmington Chemical Corp, Wilmington, Del.; 54 parts by weight of a bisphenol A-formaldehyde resin curing agent identified as UCAR BRWE 5400 sold by Union Carbide Corp.; 0.6 parts by weight of 2-methylimidazole as a curing catalyst, in a glycol ether solvent identified as Dowanol® PM sold by The Dow Chemical Company, Midland, Mich.; 7 parts by weight of a polyether resin identified as Eponol 55-B-40 sold by Miller-Stephenson Chemical Co., Danbury, Conn.; and 1.5 parts by weight of fumed silica identified as Cab-O-Sil® sold by Cabot Corp., Billerica, Mass. The adhesive is partially dried on the paper in an oven at 130° C. for 6.5 minutes.

The sheet with the adhesive node lines is cut parallel to the node lines to form 50 smaller sheets. The cut sheets are stacked one on top of the other, such that each of the sheets is shifted to the other by half a pitch or a half the interval of the applied adhesive node lines. The shift occurs alternately to one side or the other, so that the final stack is uniformly vertical. The stack of sheets is then hot-pressed at 345 kPa at a first temperature of 140° C. for 30 minutes and then at a temperature of 177° C. for 40 minutes, causing the node line adhesive to cure and thus bond adjacent sheets.

Using an expansion frame, the bonded aramid sheets are then expanded in the direction counter to the stacking direction to form cells having an equilateral cross section. Each of the sheets are extended between each other such that the sheets are folded along the edges of the bonded node lines and the portions not bonded are extended in the direction of the tensile force to separate the sheets from each other. After the expansion, the honeycomb block, being in the special frame, is heat treated in the oven with temperature raised to 270° C. and maintained for 30 minutes to fix or set the block in its expanded shape.

The honeycomb block is then placed in an impregnating bath or dip tank containing a solution of PLYOPHEN® 23900 phenolic resin from Durez Corporation. After impregnating with resin, the honeycomb is taken out from the bath and is dried in a drying furnace using hot air. The honeycomb is heated from room temperature to 82° C. in this manner and then this temperature is maintained for 15 minutes. The temperature is then increased to 121° C. and this temperature is maintained for another 15 minutes, followed by increasing the temperature to 182° C. and holding at this temperature for 60 minutes. The dipping and curing steps are repeated 8 times. The final dipped and cured honeycomb with improved compression strength has a bulk density of about 112 kg/m$^3$.

Example 6

A honeycomb block can be made in the following manner. Paper prepared according to Comparative Example 2 is used as a raw material to make the block. The honeycomb block is made as in Example 5 except the expanded block is heat treated in the oven at a temperature of about 320° C. for 20 minutes. The final bulk density properties of the dipped and cured honeycomb are similar to the honeycomb from Example 5.

As it can be seen from the data of Table 1, just the usage of the formed paper instead of calendered paper gives only marginal increase in normalized peak load at bend (comparative examples 3-4 and 1-2 respectively). Also, heat treatment of the formed paper at temperature below an optimum temperature doesn't change normalized peak load at bend (comparative examples 5 and 6). Calendered paper was exposed to very high temperature during calendering, however its normalized peak load at bend is even slightly lower than for formed paper. (comparative examples 3 and 4). So, only the paper with low density/high void content and exposed to necessary high temperature (examples 1 and 2) provides significantly increased normalized peak load at bend for the honeycomb cell wall. It can be seen from the same Table that 2 mil thick commercial calendered NOMEX® paper type T412 provides about the same characteristics as calendered paper from our comparative example 3. The very close values for normalized peak load at bend for the papers having different basis weight such as papers from examples 1 and 2 and comparative examples 1 to 6 confirm that the method of the normalization of the peak load at bend was chosen correctly.

Examples 3 and 4 show how coating with a resin further increases peak load at bend for the cell wall of the honeycomb of this invention. However, normalized peel load is going down. This can be explained by a higher density of the cured phenolic resin (about 1.1 g/cm3) in comparison with the paper density, so the relative increase of thickness is less than the relative increase in weight.

Comparative examples 7 and 8 demonstrate that after some resin coating of calendered high density/low void content paper, its peak load at bend and normalized peak load at bend are much lower in comparison with the paper of cell wall of the current invention.

In all cases, peak load at bend was measured in the cross direction of the paper because it matches the Z-direction of the honeycomb cell wall produced by the conventional methods described above.

TABLE 1

Properties of M-Aramid Papers

| Example | Basis weight, (g/m$^2$) | Thickness (mm) | Density (g/cm$^3$) | Void content (%) | Peak load at bend, (gf) | Normalized peak load at bend in cross direction of the paper, mgf/(g/m2)^3 | Gurley air resistance (secs./100 ml) | Paper Treatment |
|---|---|---|---|---|---|---|---|---|
| Ex. 1 | 42.0 | 0.124 | 0.34 | 75 | 28.5 | 0.38 | 320 | Heat treated @ 325° C. Not calendered |
| Comp. 1 | 40.0 | 0.123 | 0.33 | 76 | 15.4 | 0.24 | 370 | Not heat treated & not calendered |
| Comp. 3 | 42.0 | 0.056 | 0.75 | 44 | 15.0 | 0.20 | >10 hours | Calendered @ 350 C. and 3000 N/cm pressure. |
| Comp. 5 | 40.3 | 0.123 | 0.33 | 76 | 18.6 | 0.28 | 360 | Heat treated @ 260° C. Not calendered |
| Sample of 2 mil NOMEX ® paper T412 | 39.0 | 0.052 | 0.75 | 44 | 14.0 | 0.24 | >10 hours | |
| Comp. 2 | 59.7 | 0.163 | 0.37 | 73 | 56.6 | 0.27 | 510 | Not heat treated & not calendered |
| Comp. 6 | 61.0 | 0.168 | 0.36 | 73 | 57.1 | 0.25 | 510 | Heat treated @ 260° C. Not calendered |
| Ex. 2 | 62.0 | 0.171 | 0.36 | 73 | 86.5 | 0.36 | 460 | Heat treated @ 325° C. Not calendered |
| Comp. 4 | 61.0 | 0.079 | 0.77 | 43 | 49.4 | 0.22 | >10 hours | Calendered @ 350 C. and 3000 N/cm pressure |

TABLE 2

| | | Properties of Coated Papers | | |
|---|---|---|---|---|
| Example | Paper used | Resin content in the final structure, wt. % | Peak load at bend (gf) | Normalized peak load at bend in cross direction of the paper, mgf/(g/m2)^3 |
| Ex. 3 | Example 1 | 50 | 169 | 0.29 |
| Comp. 7 | Comp. Example 3 | 25 | 28.1 | 0.16 |
| Ex. 4 | Example 2 | 46 | 411 | 0.27 |
| Comp. 8 | Comp. Example 4 | 25 | 47.1 | 0.09 |

What is claimed is:

1. A honeycomb structure comprising a plurality of interconnected walls having surfaces which define a plurality of honeycomb cells, wherein said cell walls are formed from a paper comprising:
 a) 5 to 35 parts by volume solid polymeric material and
 b) 65 to 95 parts by volume of voids and
 wherein the paper contains m-aramid fibers and m-aramid fibrids and
 wherein the paper has a normalized peak load at bend equal or greater than 0.33 mgf/$(g/m^2)^3$ and a Gurley air resistance equal or greater than 50 seconds/100 ml, and
 wherein the paper is coated with resin.

2. The honeycomb structure of claim 1 wherein the paper comprises 20-70 weight percent of m-aramid fibers and 30-80 weight percent of m-aramid fibrids.

3. The honeycomb structure of claim 1 wherein the resin is selected from phenolic, polyimide, epoxy and combinations thereof.

4. A structural panel having a honeycomb structure comprising a plurality of interconnected walls having surfaces which define a plurality of honeycomb cells, wherein said cell walls are formed from a paper comprising:
 a) 5 to 35 parts by volume solid polymeric material and
 b) 65 to 95 parts by volume of voids and
 wherein the papers contain m-aramid fibers and m-aramid fibrids and
 wherein the paper has a normalized peak load at bend equal or greater than 0.33 mgf/$(g/m^2)^3$ and a Gurley air resistance equal or greater than 50 seconds/100 ml and least one facesheet attached to an exterior portion of said honeycomb, and
 wherein said facesheet is made from resin impregnated fiber or metal.

* * * * *